(12) United States Patent
Kraus

(10) Patent No.: US 7,472,898 B2
(45) Date of Patent: Jan. 6, 2009

(54) LINEAR DRIVE FOR VIBRATORY APPARATUS

(75) Inventor: Richard B. Kraus, Barrington, IL (US)

(73) Assignee: General Kinematics Corporation, Crystal Lake, IL (US)

(*) Notice: Subject to any disclaimer, the term of this patent is extended or adjusted under 35 U.S.C. 154(b) by 0 days.

(21) Appl. No.: 10/938,111

(22) Filed: Sep. 10, 2004

(65) Prior Publication Data
US 2005/0115787 A1    Jun. 2, 2005

Related U.S. Application Data

(63) Continuation-in-part of application No. 10/338,316, filed on Jan. 8, 2003.

(51) Int. Cl.
*F16M 1/00* (2006.01)
(52) U.S. Cl. .................... 267/136; 198/766; 188/380
(58) Field of Classification Search ............. 267/118, 267/119, 136; 248/550; 188/378–380; 198/766, 198/768
See application file for complete search history.

(56) References Cited

U.S. PATENT DOCUMENTS

| | | | |
|---|---|---|---|
| 2,819,775 A | 1/1958 | Everett | |
| 2,868,357 A | 1/1959 | Thomas | |
| 3,668,939 A | 6/1972 | Schrader | |
| 4,042,230 A | 8/1977 | Akimoto | |
| 4,149,627 A | 4/1979 | Dumbaugh et al. | |
| 4,256,014 A * | 3/1981 | Kroger | 91/216 B |
| 4,495,826 A | 1/1985 | Musschoot | |
| 4,635,892 A | 1/1987 | Baker | |
| 5,456,341 A | 10/1995 | Garnjost et al. | |
| 6,155,404 A | 12/2000 | Musschoot | |
| 6,237,748 B1 | 5/2001 | Kroger | |
| 6,357,579 B1 | 3/2002 | Patterson et al. | |
| 6,622,849 B1 | 9/2003 | Sperling | |
| 7,322,569 B2 * | 1/2008 | Kraus | 267/136 |
| 2001/0015314 A1 | 8/2001 | Kroger | |

FOREIGN PATENT DOCUMENTS

BE         505387          9/1951

OTHER PUBLICATIONS

European Search Report for European Patent Application No. EP 03029880, dated Mar. 31, 2004, 4 pages.
"Is it a Mode Shape, or an Operating Deflection Shape?", Mark H. Richardson, Sound & Vibration Magazine, 30th Anniversary Issue, Mar. 1997, pp. 1-11.

* cited by examiner

Primary Examiner—Christopher P Schwartz
(74) Attorney, Agent, or Firm—Marshall, Gerstein & Borun LLP

(57) ABSTRACT

A three mass vibratory apparatus for processing work material includes a bed defining a transport surface for receiving the objects, an elastic amplifier having a first end connected to the bed and a second end, and a drive base connected to the elastic amplifier second end. A linear actuator is mounted on the drive base and adapted to generate a linear vibratory force that is amplified by the elastic amplifier thereby to move the bed in a vibratory motion, so that the work material moves in response to the vibratory motion of the bed. The bed defines a first mass, the drive base and linear actuator define a second mass, and the reciprocating weight defines a third mass, the first, second, and third masses being isolated from rigid coupling to one another.

10 Claims, 5 Drawing Sheets

LINEAR DRIVE FOR VIBRATORY APPARATUS

CROSS-REFERENCE TO RELATED APPLICATION

This is a continuation-in-part of U.S. patent application Ser. No. 10/338,316, filed Jan. 8, 2003, the disclosure of which is incorporated herein by reference.

FIELD OF THE DISCLOSURE

The present disclosure generally relates to vibratory process equipment and, more particularly, to drives for generating vibratory motion in such equipment.

BACKGROUND OF THE DISCLOSURE

Vibratory process equipment is used in a wide variety of industrial applications. Vibratory feeders and conveyors, for example, may be used to transport granular material, foundry castings, or other objects. Such feeders and conveyors typically include a bed on which the objects are transported and a drive for producing a vibratory motion of the bed which advances the objects in the desired direction. The drive typically includes an electric motor with eccentric weights mounted on the output shaft. In operation, the output shaft with eccentric weights is rotated to generate vibratory force that is transferred to the bed.

Vibratory process equipment may be classified by the number of non-rigidly coupled masses used to generate the vibratory motion. As such, systems are known that may be classified as one, two, or three mass systems. In single mass systems, the drive is rigidly connected to the bed and the drive/bed combination is isolated from surrounding terrain by an elastic member. In two or three mass systems, the drive is elastically coupled to the bed, and either the drive or the bed is isolated from surrounding terrain by an elastic member, which may be preferable in many applications since they are capable of more efficiently producing vibratory movement. Consequently, a smaller motor may used be used in a two-mass system to produce a force having the same amplitude as that of a single-mass system having a larger motor.

The conventional rotating motors produce a rotational force that may have an unnecessary and undesired force component. Various types of vibratory process equipment require a bed to be driven in a desired direction. The rotational force produced by rotating eccentric weights, however, generates a force component that is perpendicular to the desired direction. In addition, for two mass systems, the drive is coupled to the bed by an elastic member that is not restricted as far as the direction in which it is excited. More specifically, the elastic member will typically have several degrees of freedom in which it may be excited. A coil spring, for example, has six primary degrees of freedom (i.e., movement along the X, Y, and Z axes and rotation about the X, Y, and Z axes). Each degree of freedom may have a resonant frequency associated therewith, and therefore the elastic member may be excited in any number of directions depending on the operating frequency of the motor. Often, the vibratory process equipment requires the force to be applied in a single direction or degree of freedom, and therefore forces in the direction of any of the other degrees of freedom are undesirable, thereby detracting from the desired motion and reducing efficiency of the system.

In addition, vibratory process equipment using conventional rotating motors have a rotational inertia that delays stopping and starting of the equipment. As the rotating motors are accelerated from rest to the operating speed, the resulting vibratory force passes through various undesirable frequencies that may excite the connecting or isolation elastic members in undesirable directions. Still further, the vibratory force passes through the same undesirable frequencies as the motors decelerate from operating speed to rest. For example, specific frequencies may cause isolation bounce, isolation rock, and rocking between the drive and the bed, among others. These undesirable motions cause extraneous movement of the bed, which may be particularly undesirable for applications requiring quick starting and stopping, such as precision feeders.

Figure 1:
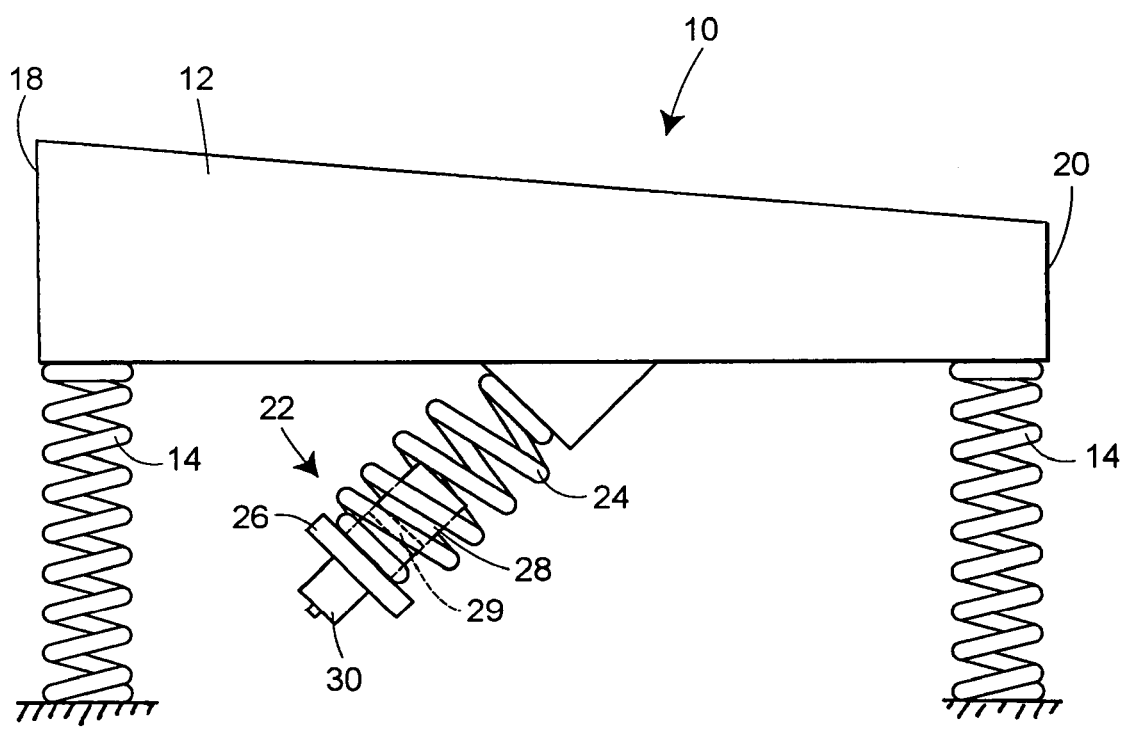
FIG. 1 is a side elevation view of a first embodiment of a vibratory process apparatus constructed in accordance With the disclosure.

While the following disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions, and equivalents falling within the spirit and scope of the disclosure as defined by the appended claims.

DETAILED DESCRIPTION

The embodiments described herein are not intended to be exhaustive or to limit the scope of the disclosure to the precise form or forms disclosed. The following embodiments have been chosen and described in order to best explain the principles of the disclosure and to enable others skilled in the art to follow its teachings. While the embodiments of vibratory process apparatus illustrated herein are commonly referred to as feeders or conveyors, it will be appreciated that the teachings of the present disclosure may be used in other applications, such as compaction tables, grinding mills, or other vibratory processing equipment.

Referring now to the drawing, FIG. 1 illustrates a feeder 10 of the type generally well known in the art. The feeder 10 includes a bed such as trough 12, which defines a work surface for receiving the work material to be processed. The trough 12 has a receiving end 18 and a discharge end 20, and is supported on elastic members such as springs 14 which isolate the bed from the surrounding terrain.

A vibratory drive 22 is elastically coupled to the trough 12 for generating a vibratory motion of the bed. In the embodiment illustrated at FIG. 1, the drive 22 is connected to the trough 12 by an elastic member such as spring 24. The drive 22 includes an exciter or drive base 26 supporting a linear actuator 28 and a tuning weight 30. While the linear actuator 28 is illustrated in FIG. 1 as being positioned inside the spring 24, it will be appreciated that the actuator may be positioned at other points on the drive base 26. Furthermore, while a single spring 24 is illustrated, the apparatus may include multiple springs extending between the drive base 26 and trough 12. Still further, the tuning weights 30 may be attached at any point on the drive base 26 without departing from the teachings of the present disclosure.

In operation, the linear actuator 28 generates a linear force that may be sinusoidal or non-sinusoidal over time. The linear force is amplified by the spring 24 and transferred to the trough 12, resulting in vibratory motion of the trough. Material placed on the work surface of the trough 12 will move in response to the vibratory motion of the trough 12.

In the apparatus of FIG. 1, the linear actuator 28 and spring 24 are angled to produce a bed motion that raises and translates the work material to the right, so that the work material will move from the receiving end 18 to the discharge end 20 of the trough 12. The orientation of the drive and or springs may be modified to move the work material in different manners. For example, the drive and springs may be oriented so that work material placed on the work surface is compacted. In general, the spring is oriented so that the appropriate degree of freedom of the spring is aligned with the line of motion generated by the linear actuator 28 so that, when the actuator is at an appropriate operating frequency, the spring will be excited at a natural frequency in the desired direction, thereby to move the trough 12 in the desired motion.

Figure 1A:
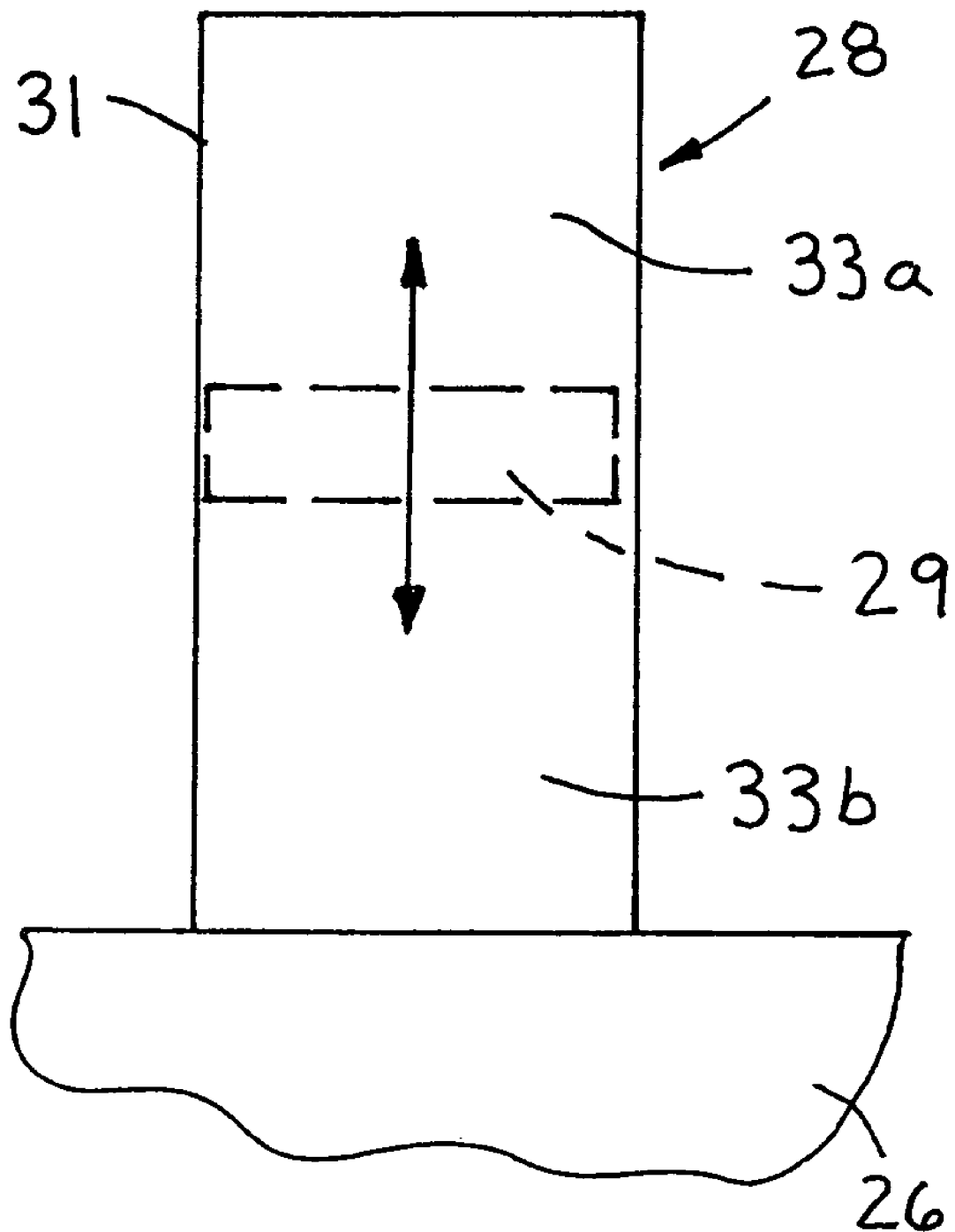
FIG. 1A is an enlarged schematic view of an actuator incorporated into the apparatus of FIG. 1.

The linear actuator 28 may be operated pneumatically, hydraulically, or otherwise. In the illustrated embodiment, the linear actuator 28 includes a reciprocating piston 29 disposed inside a housing 31 to generate the vibratory force, as best seen with reference to FIG. 1A. The piston 29 engages the interior surface of the housing 31 to define upper and lower chambers 33a, 33b, which form fluid cushions or air springs for the piston 29. The piston 29 is not otherwise linked or mechanically connected to any other component of the feeder, and therefore is free to slide axially within the housing 20 in response to air pressure supplied to the housing. As the piston 29 reciprocates within the housing 30, the force generated by the piston 29 is transmitted via the air springs to the drive base 26. The force is then amplified by the spring 24 and applied to the trough 12. In the illustrated embodiment, the linear piston actuator 28 may be either externally lubricated or non-lubricated.

When the linear actuator 28 is pneumatic or hydraulic, the fluid pressure to the actuator 28 may be controlled to adjust not only the frequency at which the piston 29 reciprocates but also to adjust the force output of the actuator 28. For example, when the actuator 28 is operated at sub-resonant frequencies, which are below the natural frequency of the spring 24, an increase in fluid pressure provided to the actuator 28 will increase the vibration amplitude or stoke. Specifically, the increased air pressure causes an increase in the cycles per minute of the piston 29, which in turn will increase stroke. It will be appreciated, therefore, that the actuator allows for adjustment of both frequency and amplitude of the vibratory force, and the adjustment is substantially infinite, rather than incremental.

The feeder 10 disclosed herein is considered to be a three-mass system. The number of masses defined in a system may be determined by the number of separate, non-rigidly coupled structures employed by the system to generate the desired vibratory motion. In the illustrated feeder 10, the trough 12 is elastically connected to the drive 22, and therefore defines a first mass (i.e., the trough and any rigidly coupled members). The drive base 26, piston housing 30, and any component rigidly connected thereto define a second mass. In addition, the piston 29 of the linear actuator 28 is coupled to the housing by the air springs, and therefore it defines a third mass. Accordingly, the feeder 10 is properly considered to be a three-mass system.

Figure 2:
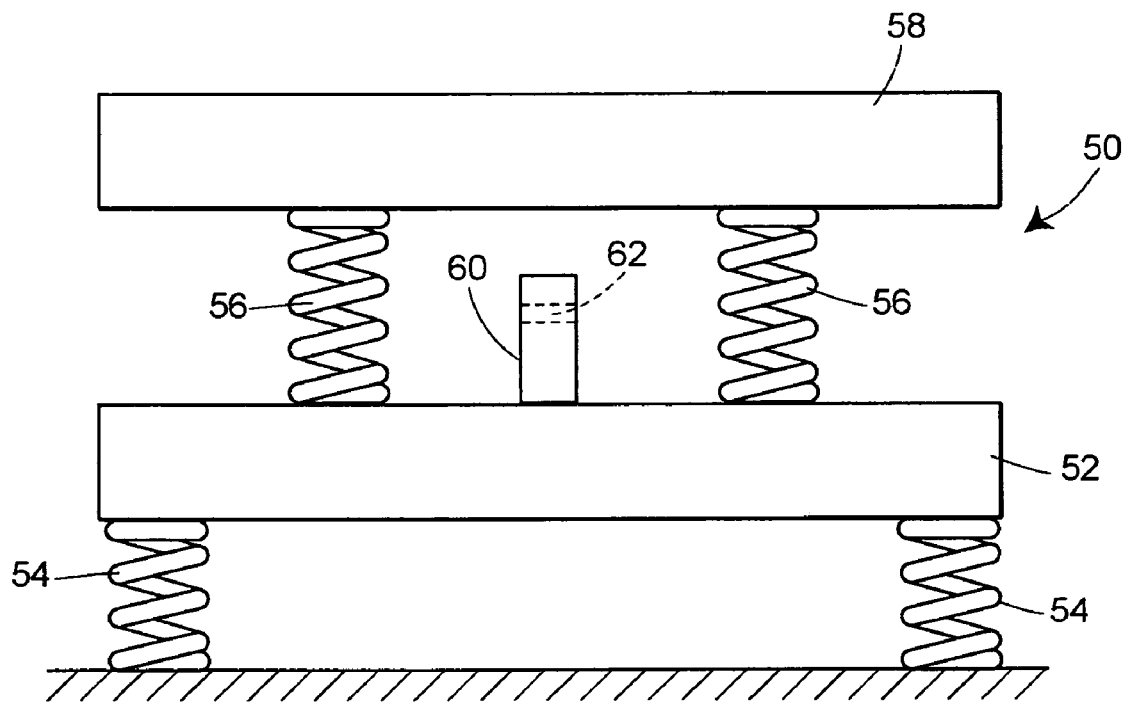
FIG. 2 is a side elevation of an alternative embodiment of a vibratory process apparatus constructed in accordance with the disclosure.

FIG. 2 illustrates an alternative embodiment of a vibratory apparatus 50 constructed in accordance with the teachings of the present disclosure. The vibratory apparatus 50 includes a drive base 52 supported by isolation springs 54 above the surrounding terrain. Amplifying springs 56 have first ends attached to the drive base 52 and second ends attached to a bed 58. The bed 58 defines a work surface for receiving a work material.

A linear actuator 60 is attached to the drive base 52 for generating a vibratory force. The linear actuator 60 may include a reciprocating piston 62 that is operated using pneumatic or hydraulic pressure. In operation, the reciprocating piston generates a force that is amplified by the springs 56 to create a vibratory motion of the bed 52.

The primary difference between the embodiments of FIGS. 1 and 2 is the location of the isolation springs. In the FIG. 1 embodiment, the isolation springs are coupled directly to the trough 12, while in the embodiment of FIG. 2, the isolation springs are coupled to the drive base 52. Apart from the isolation springs, the construction and operation of the two embodiments are quite similar. This embodiment is also considered to be a three-mass system consisting of the bed 58, drive base 52, and piston 62.

Figure 3:
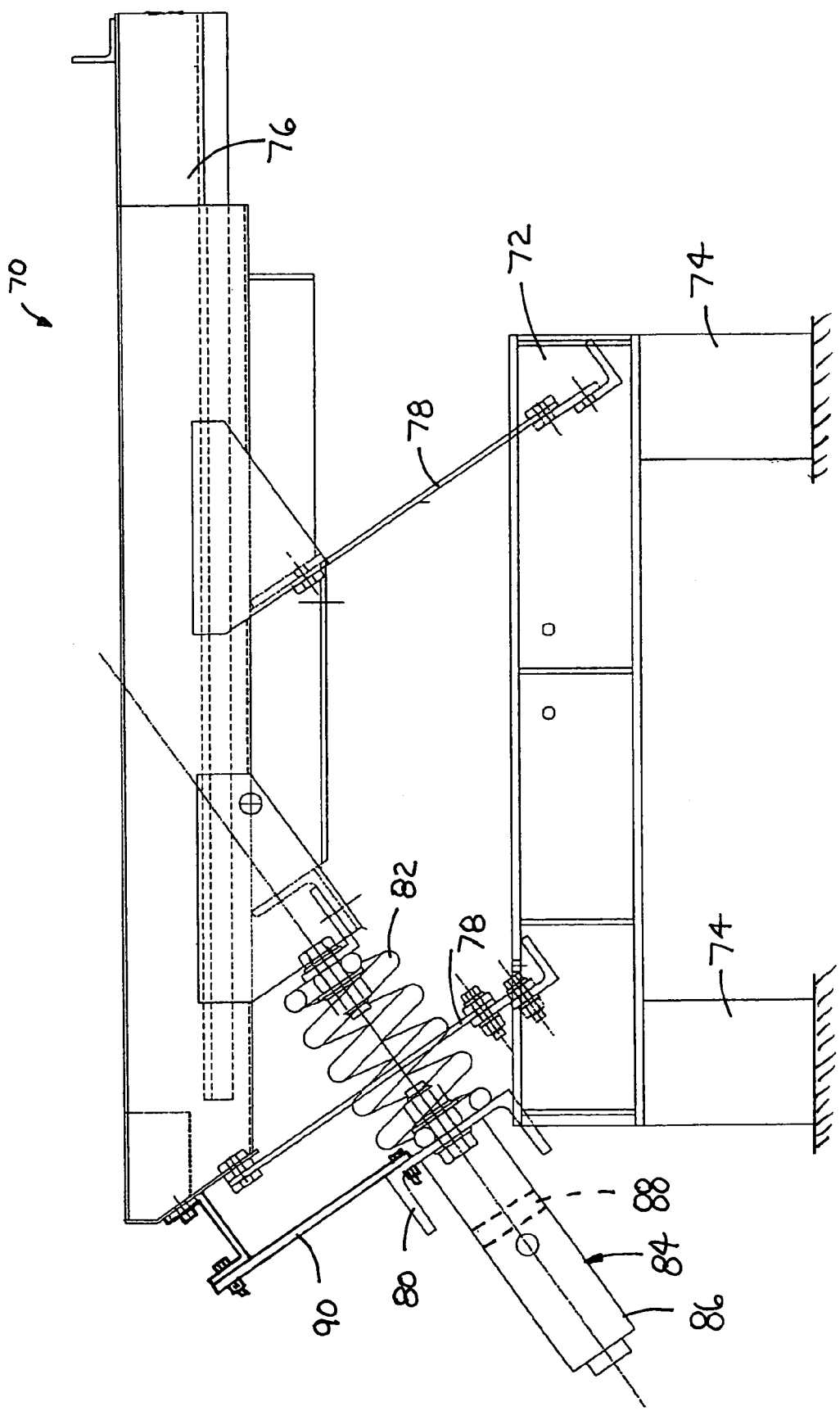
FIG. 3 is a side elevation view of yet another embodiment of a vibratory process apparatus constructed in accordance with the disclosure.

FIG. 3 illustrates another vibratory apparatus is the form of a conveyor 70 according to the disclosure. The conveyor 70 is similar to the feeder disclosed in FIG. 1, but includes additional structure for reducing force generation in undesirable directions.

Figure 4:
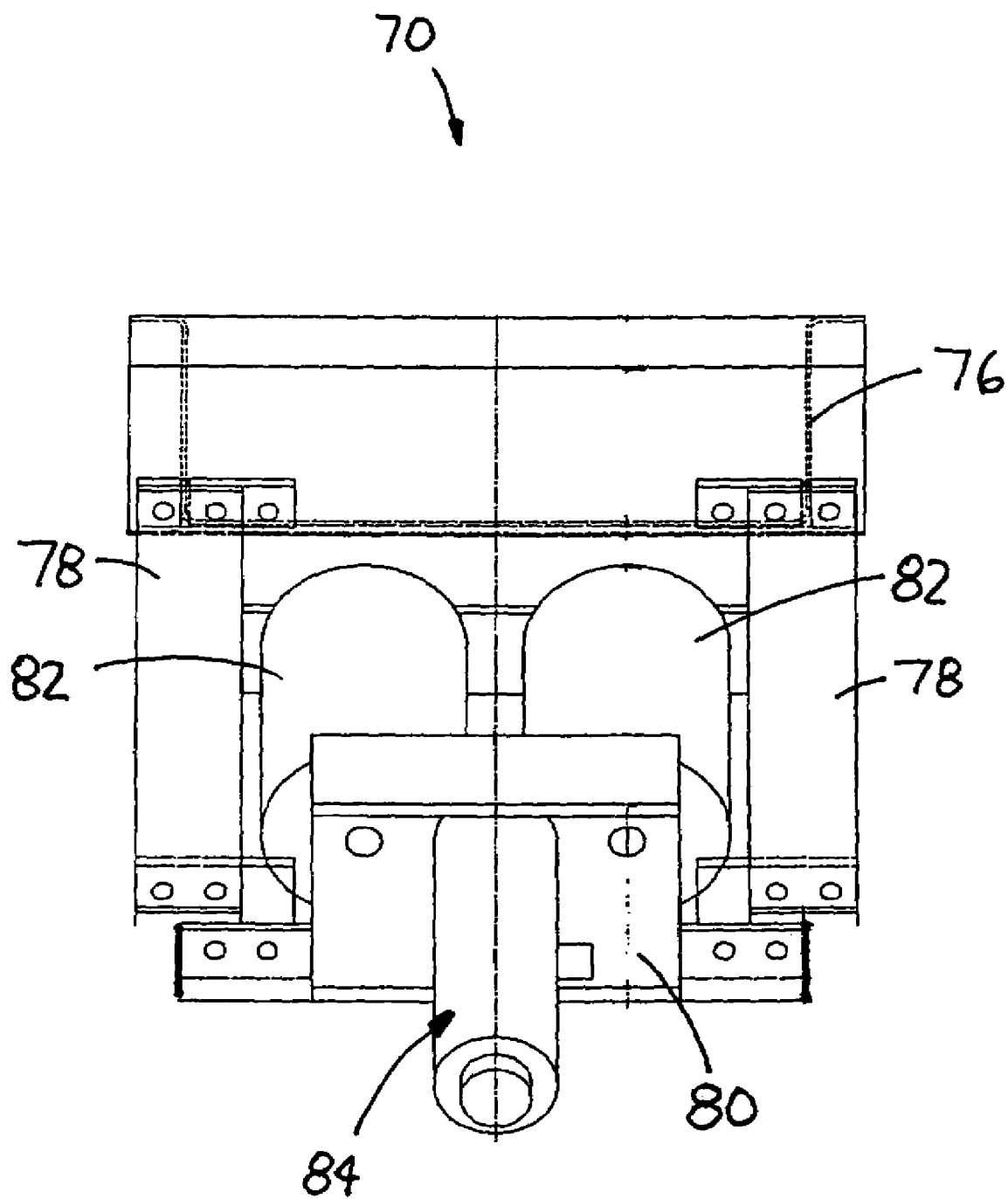
FIG. 4 is an end view of the apparatus of FIG. 3, with certain components removed for clarity.

More specifically, the conveyor 70 includes a frame 72 connected to the surrounding terrain by isolator springs 74. A bed 76 is resiliently coupled to the frame 72 by slat springs 78. A drive base 80 is resiliently coupled to the bed 76 by a plurality of coil springs 82 (FIG. 4). While coil springs are shown in the illustrated embodiment, it will be appreciated that other types of elastic amplifiers, such as rubber springs, may be used.

An actuator 84 is coupled to the drive base 80. The actuator includes a housing 86 enclosing a reciprocating piston 88. The piston 88 generates a vibratory force that is amplified by the springs 82 to drive the bed 76, and therefore operation of the conveyor 70 is similar to the feeders described above with reference to FIGS. 1 and 2.

The conveyor 70 may further include a stabilizer link 90 for attenuating forces in undesirable directions. In the illustrated embodiment, the stabilizer link 90 comprises a stabilizing slat having a first end connected to the base 80 and a second end connected to the bed 76. Alternatively, the stabilizer link 90 may be coupled between the frame 72 and the drive base 80. Either way, the stabilizer link 90 is adapted to allow vibration in the desired direction while damping forces applied in other directions. As such, the stabilizer link 90 may be formed of any material and in any shape such that it has a spring constant insufficient to produce amplification during operating frequencies of the actuator 84.

The above embodiments use a linear actuator to produce a vibratory force in a three mass system. The force produced by the linear actuator acts primarily in a single direction, and therefore the perpendicular force component (and the resulting detrimental effect on the desired vibratory motion) generated by conventional drives having rotating motors is minimized or eliminated. In addition, linear actuators weigh significantly less than rotating electric motors with eccentric weights, and therefore the weight of the drive may be reduced. This is significant for applications in which the material to be processed is light, since the bed must weigh more than the drive for the apparatus to operate efficiently. Still further, when the linear actuator is operated by pressurized fluid, it is more finely adjustable than electric motors, thereby allowing greater control of the rate at which the objects are transported. Finally, the use of the linear actuator in a three mass system not only allows adjustment of frequency but also amplitude, thereby allowing further adjustment of the vibratory drive in a simple and inexpensive manner.

Numerous modifications and alternative embodiments of the disclosure will be apparent to those skilled in the art in view of the foregoing description. Accordingly, this description is to be construed as illustrative only and is for the purpose of teachings those skilled in the art the best mode of carrying out the disclosure. The details of the structure may be varied substantially without departing from the spirit of the disclosure, and the exclusive use of all modifications which come within the scope of the appended claims is reserved.

The invention claimed is:

1. A three mass vibratory feeder apparatus for transporting work material, the apparatus comprising:
    a bed defining a transport surface for receiving the work material;
    an elastic amplifier having a first end connected to the bed and a second end;
    a drive base connected to the elastic amplifier second end;
    a pneumatically operated linear actuator including a housing mounted on the drive base and a reciprocating mass slidably disposed in the housing, wherein the reciprocating mass is isolated from mechanical connection to any component outside of the housing, the reciprocating mass being responsive to pneumatic fluid pressure supplied to the actuator, wherein the pneumatic fluid pressure is controlled to generate a linear vibratory force that is amplified by the elastic amplifier thereby to move the bed in a vibratory motion; and
    at least one flexible stabilizer link having first and second ends, the first end rigidly connected to the drive base and the second end rigidly connected to the bed, the drive base being supported only by the elastic amplifier and the at least one flexible stabilizer link,
    wherein the bed defines a first mass, the drive base and linear actuator define a second mass, and the reciprocating mass defines a third mass, the first, second, and third masses being isolated from rigid coupling to one another.

2. The apparatus of claim 1, in which the reciprocating mass comprises a piston that is actuated at a frequency and an amplitude.

3. The apparatus of claim 2, in which the frequency and amplitude of the piston are adjustable.

4. The apparatus of claim 1, in which the elastic amplifier comprises at least one spring.

5. The apparatus of claim 1, wherein the first end of the at least one stabilizer link is attached with fasteners to the drive base and the second end is attached with fasteners to the bed.

6. A three mass vibratory feeder apparatus for transporting work material, the apparatus comprising:
    a bed defining a transport surface for receiving the work material;
    an elastic isolator coupled to the bed for isolating the bed from an underlying terrain;
    an elastic amplifier having a first end connected to the bed and a second end;
    a drive base connected to the elastic amplifier second end;
    a pneumatically operated linear actuator including a housing mounted on the drive base and a reciprocating mass slidably disposed in the housing, wherein the reciprocating mass is isolated from mechanical connection to any component outside of the housing, the reciprocating mass being responsive to pneumatic fluid pressure supplied to the actuator, wherein the pneumatic fluid pressure is controlled to generate a linear vibratory force that is amplified by the elastic amplifier thereby to move the bed in a vibratory motion; and
    at least one flexible stabilizer link having first and second ends, the first end rigidly connected to the drive base and the second end rigidly connected to the bed, the drive base being supported only by the elastic amplifier and the at least one flexible stabilizer link,
    wherein the bed defines a first mass, the drive base and linear actuator define a second mass, and the reciprocating mass defines a third mass, the first, second, and third masses being isolated from rigid coupling to one another.

7. The apparatus of claim 6, in which the reciprocating mass comprises a piston that is actuated at a frequency and an amplitude.

8. The apparatus of claim 7, in which the frequency and amplitude of the piston are adjustable.

9. The apparatus of claim 6, in which the elastic amplifier comprises at least one spring.

10. The apparatus of claim 6, wherein the first end of the at least one stabilizer link is attached with fasteners to the drive base and the second end is attached with fasteners to the bed.

* * * * *